July 3, 1956
B. A. MACKEY
2,752,965
DRILL BIT CONSTRUCTION
Filed April 20, 1953
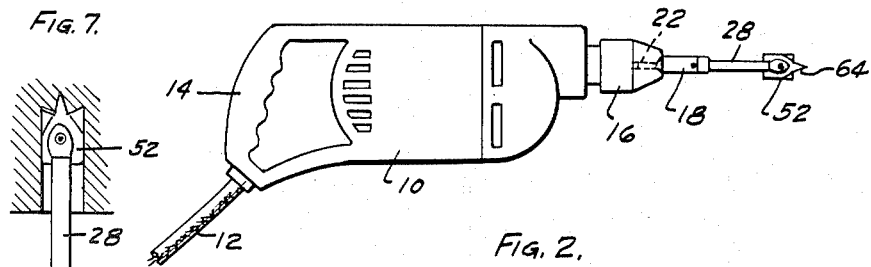
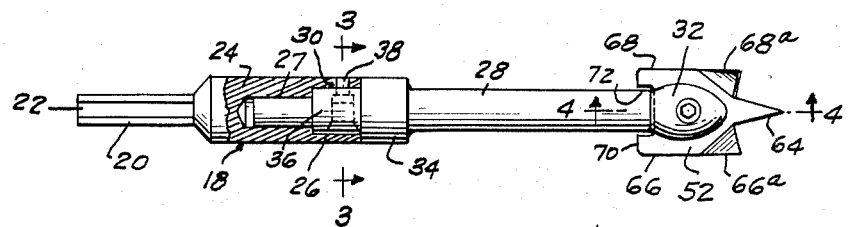
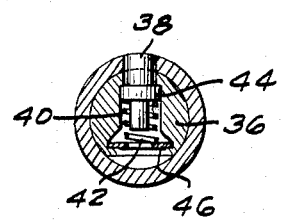
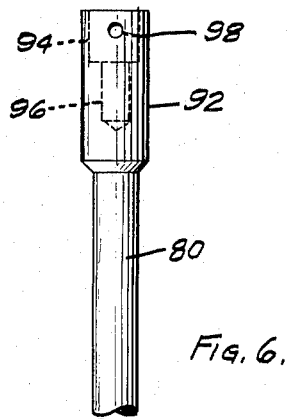
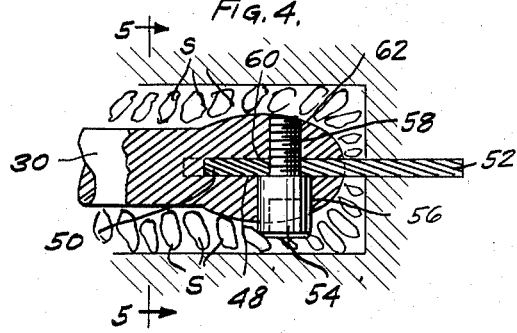
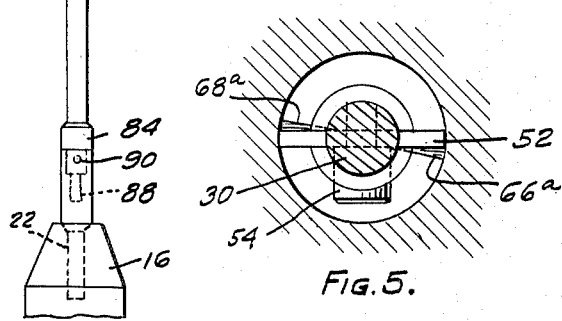
INVENTOR.
BRUCE A. MACKEY
BY
Harry N. Hilgeman
ATTORNEY.

United States Patent Office

2,752,965
Patented July 3, 1956

2,752,965

DRILL BIT CONSTRUCTION

Bruce A. Mackey, Libertyville, Ill.

Application April 20, 1953, Serial No. 349,922

3 Claims. (Cl. 145—116)

My invention relates to improvements in drill bit construction.

My invention relates more particularly to drill bits of the type used for boring holes in wood, plastics, aluminum or other generally similar materials, and contemplates the provision of a drill shank having a bit blade holder capable of operatively receiving any one of a plurality of different size bit blades which are easily and quickly attached or removed.

My invention further contemplates the provision of standard extensions for the drill bit shank so that a long hole, a series of aligned holes, or holes in roofs, ceilings or other generally inaccessible places can easily be made by the employment of one or more of the extensions, depending upon the distance from the portable electric motor to the location or length of the proposed hole or holes to be bored.

A further feature of the invention resides in the spring-pressed lock connection which I provide between the drill bit shank and an extension, the same construction being applied between connecting ends of a plurality of extensions.

Other features of the invention include the details of construction of the connection of the drill bit blade to the shank head, the shape and location of the same, and the advantages inherent therein.

For a more comprehensive understanding of the invention and the advantages thereof, reference is had to the accompanying drawing, upon which Fig. 1 is a side elevational view of a portable electric drill motor having the usual chuck in which my improved drill bit holder and bit are mounted;

Fig. 2 is a full size elevational view of the chuck connector, drill bit holder and bit shown in Fig. 1;

Fig. 3 is an enlarged sectional view taken through the chuck connector and drill bit holder on the line 3—3 of Fig. 2;

Fig. 4 is an enlarged cross-sectional view through the head of the bit holder and bit showing the same boring a hole in wood, and is taken generally on the lines 4—4 of Fig. 3;

Fig. 5 is a cross-sectional view thereon taken on the lines 5—5 of Fig. 4;

Fig. 6 is a side elevational view of a drill bit holder extension which I employ; and Fig. 7 is a side elevational view showing the manner in which the drill bit holder and different size extensions are connected together and to the chuck connector for boring long holes or for boring holes in comparatively inaccessible places.

In the embodiment of the invention which I have chosen to illustrate the same, I show a portable electric drill motor 10 provided with the extension cord 12 of a desired length, a handle 14, and a tool receiving chuck 16 extending forwardly from the same. The chuck 16 may be of the usual type having arcuate radial jaws which are adapted to fasten over the shank of a drill or other tool which is disposed therein and axially extended forwardly from the chuck.

In connection with using the above type of motor for driving a drill bit holder, I prefer to employ a connector 18 which may have a shank 20 extending therefrom, the shank having a plurality of flattened sides 22 received by the jaws in the chuck 16. The connector 18 may have a body portion 24 which has an axial end opening 26 and a reduced extension 28. I also provide a wall opening 30 adjacent the open end of the bore 26.

The drill bit holder 28 which I employ may be formed with a body shank 30 terminating in a split bit supporting head 32 at its forward end and an enlarged shoulder 34 at the opposite end formed with a reduced extension 36. The extension 36 is adapted to be telescopically received in the bore 26 of the connector 18, the extension carrying a spring-pressed pin 38 which when the parts are connected is received in the wall opening 30 of the connector 18 to lock the connector 18 and the drill bit holder 28 together in alignment in a driving relation.

The pin 36 is mounted in a bore 40 in the extension 36 with a coiled spring member 42 pressing the shoulder 44 of the same against the end of the bore 40, the spring being held in position by a washer 46 fastened over the opening 40. To separate the connector 18 and the drill bit holder 28, it is only necessary to press down on the end of the spring-pressed pin 38 so that it clears the bore 26.

The drill bit holder head 32 has a medial slot 48 extending from the end of the same inwardly to the point 50 to receive the drill bit blade 52 which is fastened therein by means of a screw member 54 that has a head 56 passing through half of the holder head 32 with the threaded portion 58 passing through an opening 60 in the blade 52 and engaging in a tapped opening 62 in the other portion of the drill bit holder head 32. The bit blade 52 is preferably furnished in a set of blades of a plurality of sizes. For example, a set may consist of ½", ⅝", ¾", ⅞" and 1" bit blades, so that holes of these sizes may be drilled with the set provided, although it will be understood that other size sets, within limits, may be provided.

Each of the bit blades 52 is generally rectangular in shape as shown, having a leading point 64 at its work engaging end and parallel side walls 66 and 68 and a top wall 70 having a rectangularly shaped slot 72 therein. Each blade has a portion of the side walls bent from the plane of the body, the edge 68a and the edge 66a being bent in the direction of rotation as shown in Fig. 2. The lower edge of each of the bent portions is sharpened to provide a cutting edge, and the edges of the side walls 66a and 68a are also cleared by sharpening to give them a cutting angle so that shaving will be fed inwardly from the edge of the hole being bored to effect a much cleaner and smoother bore. In addition, by the use of the forwardly disposed angle of the front cutting edges, much more rapid progress is made and holes are much more quickly bored and will be cleaner and smoother on their interior walls when finished.

The general construction of these blades is shown and described in my co-pending application for U. S. Patent Serial No. 314,298, heretofore filed. I have discovered, however, that in order to prevent the shavings S from packing adjacent the end of the hole being bored, in a manner similar to log jams in a river, that a special construction of the head of the drill bit holder would effectively eliminate this packing. Accordingly, I have attached the blade to the head 52 considerably closer to the cutting edges 66a and 68a, and have formed the head with an enlarged arcuate shape, as shown. With this shape, after the shavings are cut from the wood they tend to separate as they move between the constricted space around the largest diameter of the head upward, and instead of obtaining a packing of the shavings, they become loosened or more loosely packed as they pass over the enlarged head and work their way upward in the hole along the reduced diameter of the shank 30 of the drill bit holder.

Where it is desired to bore longer holes than the length of the drill bit holder 28, or to bore holes in inaccessible places at a distance from the portable electric motor 10, I provide a set of extensions which may include the 6-inch extension 80 and the 12-inch extension 80. These extensions are identical except for the length of the shank of the same, and each is provided with a male end including the enlarged shoulder 84, the reduced extension 86 and the stem 88. A spring-pressed plunger 90, similar in construction to that found in the drill bit holder 28, is provided in each of the extensions 86. The female end of the extension may include the elongated shoulder 92 which has an axial bore 94 in the end of the same and a reduced extension bore 96. A wall opening 98 is also provided. The male end of an extension is adapted to be received in the bores 84 and 96 with the spring-pressed plunger locking the same in the opening 98. The female end is also adapted to be received in the connector 18 in the aligned bores 26 and 27 of the same, with the plunger 90 engaging in the opening 30.

In a similar manner the drill bit holder 28 may be engaged in the aligned bores 94 and 96 in the female end of any of the extensions 80 or 82 so that with any combination of extensions a driven drill bit holder can be provided within limits at any distance from the portable electric motor.

With this construction it can be seen that within reason boring of holes may be done a considerable distance from the operator by the use of the extension shanks which I have provided. Due to the fact that the bit blade is operated at a comparatively high rate of speed and has the curved cutting edge features which I have described, it is possible to effectively bore holes even at a distance by the use of a plurality of shank extensions.

By the use of individual blades which are easily attached or removed from the bit holder, it can be seen that when a blade becomes dull or is broken, it can be easily removed and replaced. Further, by reason of making the bits or blades detachable from the bit holder when breakage does occur it is considerably less expensive than when it occurs in the use of drill bits that are an integral part of the bit holders.

I contemplate that changes and modifications may be made in the exact details shown and I do not wish to be limited in any particular; rather what I desire to secure and protect by Letters Patent of the United States is:

1. The combination with a flat drill blade generally rectangular in shape, having front cutting edges, a back edge and side edges, a centrally located tapered lead point extending forward from the front edges of the same, the front cutting edges and a portion of each of said side edges being bent from the plane of the body of the blade in the direction of rotation, each of said front cutting edges being in a continuous line from the base of said lead point to the side edges of said blade, a holder for the same, said holder having an elongated stem with an enlarged head at one end, said head having a medial slot therein to receive the back end of said drill blade, said drill blade also having a hole medially disposed between its side edges and adjacent the base of the tapered lead point, a mounting screw in said head passing through the hole of said blade to fasten the blade in the end of said head, said head being generally spherical with the forward edges of the same located near the base of said lead point and between the bent side edges whereby in a drilling operation wood shavings move around the spherical portion of the head upwardly in the hole being bored.

2. The combination with a flat drill blade generally rectangular in shape, having front cutting edges, a back edge and side edges, a centrally located tapered lead point extending forward from the front edges of the same, the front cutting edges and a portion of each of said side edges being bent from the plane of the body of the blade in the direction of rotation, each of said front cutting edges being in a continuous line from the base of said lead point to the side edges of said blade, of a holder for the same, said holder having an elongated stem with an enlarged head at one end, said head having a medial slot therein to receive the back end of said drill blade, said drill blade also having a hole medially disposed between its side edges and adjacent the base of the tapered lead point, a mounting screw in said head passing through the hole of said blade to fasten the blade in the end of said head, the forward end of said head located near the base of said lead point and between the bent side edges whereby in a drilling operation wood shavings move around the head upwardly in the hole being bored.

3. The combination with a flat drill blade generally rectangular in shape having front cutting edges, a back edge, side edges and a centrally located tapered lead point extending forward from the front edges of the same, of a holder, said holder having an elongated stem with an enlarged head at one end, said head having a medial slot therein to receive the drill blade, said drill blade also having a hole medially disposed between its side edges and adjacent the base of the tapered lead point, a mounting screw in said head passing through the hole of said blade to fasten the blade in the end of said head, the forward end of said head located near the base of said lead point and at the intersection of the locus of the front cutting edges whereby in a drilling operation wood shavings move around the head upwardly in the hole being bored.

References Cited in the file of this patent

UNITED STATES PATENTS

| | | |
|---|---|---|
| 2,948 | Smith | Feb. 10, 1843 |
| 124,089 | Shepardson | Feb. 27, 1872 |
| 238,002 | Ransom | Feb. 22, 1881 |
| 389,335 | Spear | Sept. 11, 1888 |
| 1,480,355 | Webster | Jan. 8, 1924 |
| 1,502,528 | Reulbach | July 22, 1924 |
| 1,927,844 | Pfauser | Sept. 26, 1933 |
| 2,291,729 | Koett | Aug. 4, 1942 |
| 2,543,206 | Smith | Feb. 27, 1951 |
| 2,681,673 | Mackey | June 22, 1954 |

FOREIGN PATENTS

| | | |
|---|---|---|
| 17,756 | Great Britain | Aug. 4, 1911 |